United States Patent [19]

Kim

[11] Patent Number: 5,898,426
[45] Date of Patent: Apr. 27, 1999

[54] TOUCH PANEL INPUT DEVICE

[75] Inventor: Hee-hawn Kim, Suwon, Rep. of Korea

[73] Assignee: Samsung Display Devices Co., Ltd., Kyungki-Do, Rep. of Korea

[21] Appl. No.: 08/835,362

[22] Filed: Apr. 7, 1997

[30] Foreign Application Priority Data

Apr. 16, 1996 [KR] Rep. of Korea ............... 96-11438

[51] Int. Cl.$^6$ .................................................. G09G 5/00
[52] U.S. Cl. ..................... 345/173; 345/174; 178/18.02
[58] Field of Search .................................. 345/173, 174, 345/177, 156, 179, 178; 178/18, 19, 18.01, 18.02, 18.05, 18.06, 18.07, 18.08, 18.1

[56] References Cited

U.S. PATENT DOCUMENTS

| | | | |
|---|---|---|---|
| 4,649,232 | 3/1987 | Nakamura et al. | 178/18 |
| 4,740,781 | 4/1988 | Brown | 345/174 |
| 4,806,709 | 2/1989 | Evans | 178/19 |
| 4,897,511 | 1/1990 | Itaya et al. | 178/18 |
| 4,931,782 | 6/1990 | Jackson | 345/174 |
| 4,958,148 | 9/1990 | Olson | 345/173 |
| 5,181,030 | 1/1993 | Itaya et al. | 178/18 |
| 5,369,228 | 11/1994 | Faust | 178/18 |
| 5,670,755 | 9/1997 | Kwon | 345/173 |

*Primary Examiner*—Xiao Wu
*Attorney, Agent, or Firm*—Leydig, Voit & Mayer

[57] ABSTRACT

A touch panel input device includes a touch panel having a lower layer including a resistive conductor and an upper layer including a dielectric, a driving circuit for applying a driving signal to points on the lower layer, a voltage detecting circuit for converting a current flowing through each point into a voltage signal, a switching circuit for switching the voltage signal to generates a coordinate signal, an analog-to-digital converter for converting the coordinate signal into digital coordinate data, and protrusions, each protrusion including a resistive conductor, located on the upper layer of the touch panel.

7 Claims, 3 Drawing Sheets

5,898,426

1

TOUCH PANEL INPUT DEVICE

BACKGROUND OF THE INVENTION

The present invention relates to a touch panel input device, and more particularly, to a touch panel input device which generates coordinate data of a position on a touch panel which a pointing means, such as a finger of a user contacts.

FIG. 1 is for explaining the principle of a touch panel input device. As shown in the drawing, the touch panel input device comprises of a touch panel 11 having a lower layer 111 comprising a resistive conductor and an upper layer 112 comprising a dielectric, a driving circuit 12 for applying a driving signal to predetermined points UR, UL, LL and LR on the lower layer 111, a voltage detecting circuit 13 for converting currents $i_{UR}$, $i_{UL}$, $i_{LL}$ and $i_{LR}$ flowing toward each point into voltage signals $V_{UR}$, $V_{UL}$, $V_{LL}$ and $V_{LR}$, a switching circuit 14 for switching the voltage signals to generate a coordinate signal, and an analog-to-digital converter (ADC) 15 for converting the coordinate signal into digital coordinate data. Here, $R_{UR}$, $R_{UL}$, $R_{LL}$ and $R_{LR}$ are voltage detecting resistors each having the same resistance value.

In FIG. 1, when there is no physical contact with the surface of the upper layer 112 of the touch panel 11, there is no flow of the currents $i_{UR}$, $i_{UL}$, $i_{LL}$ and $i_{LR}$ since the touch panel 11 is in an electrically floating state. Accordingly, there is no voltage drop across any of the voltage detecting resistors $R_{UR}$, $R_{UL}$, $R_{LL}$ and $R_{LR}$ and all the voltage signals $V_{UR}$, $V_{UL}$, $V_{LL}$ and $V_{LR}$ become "0V." When the user's finger touches the surface of the upper layer 112 of the touch panel 11, the currents $i_{UR}$, $i_{UL}$, $i_{LL}$ and $i_{LR}$ flow towards the finger via the lower and upper layers 111 and 112 of the touch panel 11. Here, the respective currents $i_{UR}$, $i_{UL}$, $i_{LL}$ and $i_{LR}$ are in inverse proportion to the distance between the finger-touch point and each of the points UR, UL, LL and LR. Accordingly, a voltage drop occurs across each of the voltage detecting resistors $R_{UR}$, $R_{UL}$, $R_{LL}$ and $R_{LR}$ and each voltage varies in accordance with the position of the finger. The voltage detecting circuit 13 detects the voltage change and generates each of the voltage signals $V_{UR}$, $V_{UL}$, $V_{LL}$ and $V_{LR}$. The switching circuit 14 generates X-coordinate and Y-coordinate signals by switching. The analog-to-digital converter 15 converts the coordinate signals into digital coordinate data.

FIG. 2 is a view for explaining the operation of a conventional input device of a touch panel type. As shown in FIG. 2, the conventional touch panel 21 comprises of a lower layer 211 comprising a resistive conductor and an upper layer 212 comprising a dielectric. When a user's finger touches the surface of the upper layer 212, a current due to a driving signal flows via the lower layer 211 and the upper layer 212 toward the finger since a capacitance $C_g$ of the upper layer 212 is present. However, since an air capacitance $C_a$ is present between the upper layer 212 and the finger, noise current flows through the air capacitance $C_a$. Accordingly, accuracy and precision in relation to the output data of such an input device are lowered. Further, since the surface that the finger touches, i.e., the upper surface of the upper layer 212, is slippery, a user tends to apply force in order to press more firmly.

SUMMARY OF THE INVENTION

To solve the above problems, it is an object of the present invention to provide a touch panel input device in which noise current due to air capacitance can be decreased and a contact characteristic can be improved.

2

Accordingly, to achieve the above object, there is provided a touch panel input device including a touch panel having a lower layer comprising a resistive conductor and an upper layer comprising a dielectric, a driving circuit for applying a driving signal to a plurality of points on the lower layer, a voltage detecting circuit for converting a current flowing through each of the plurality of points into a voltage signal, a switching circuit for switching with the voltage signal to generate a coordinate signal, an analog-to-digital converter for converting the coordinate signal to digital coordinate data, and a plurality of protrusions, each comprising a resistive conductor, distributed on the upper layer of the touch panel.

BRIEF DESCRIPTION OF THE DRAWINGS

The above object and advantages of the present invention will become more apparent by describing in detail a preferred embodiment with reference to the attached drawings in which.

DETAILED DESCRIPTION OF THE INVENTION

Figure 1:
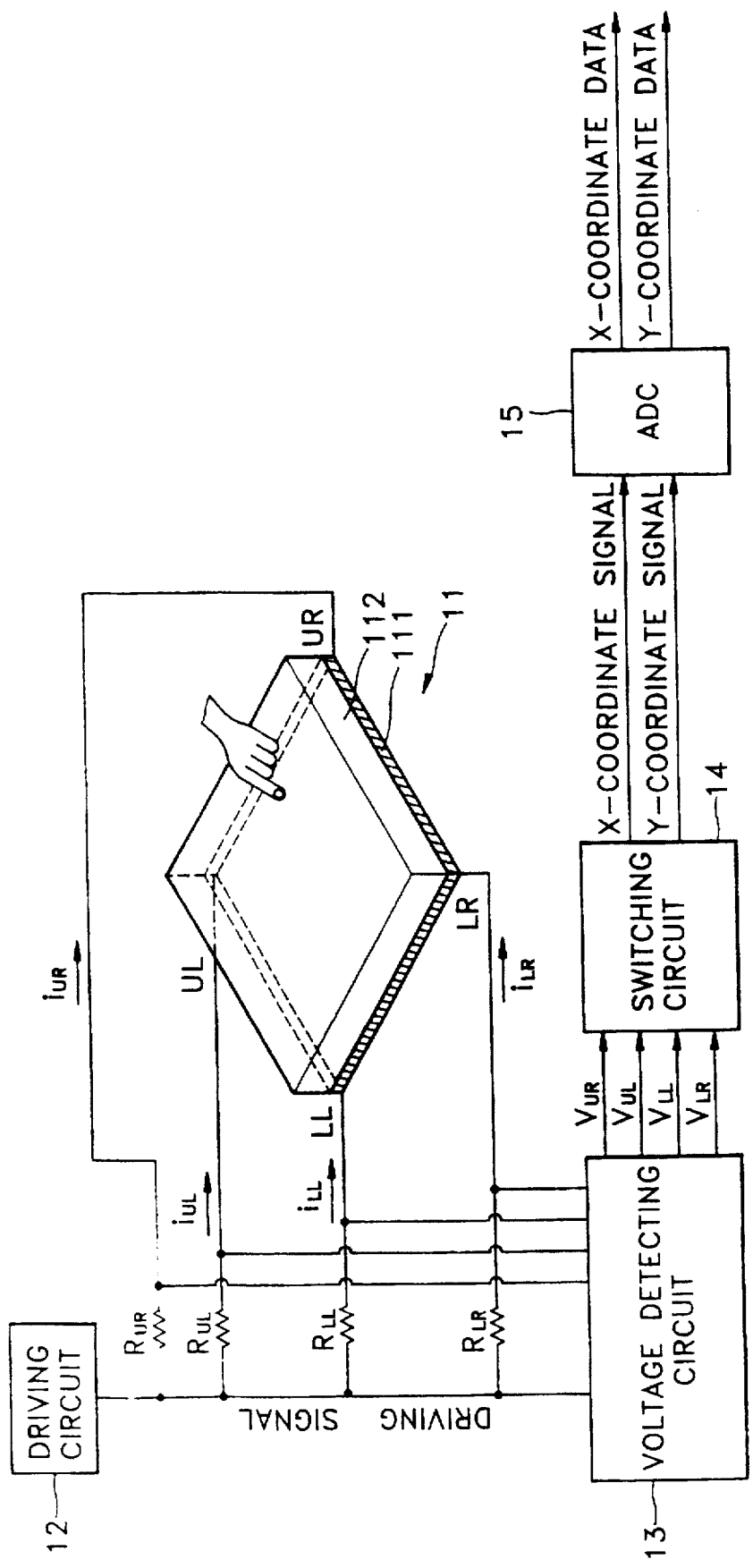
FIG. 1 is a view for explaining the principle of a touch panel input device.
Figure 2:
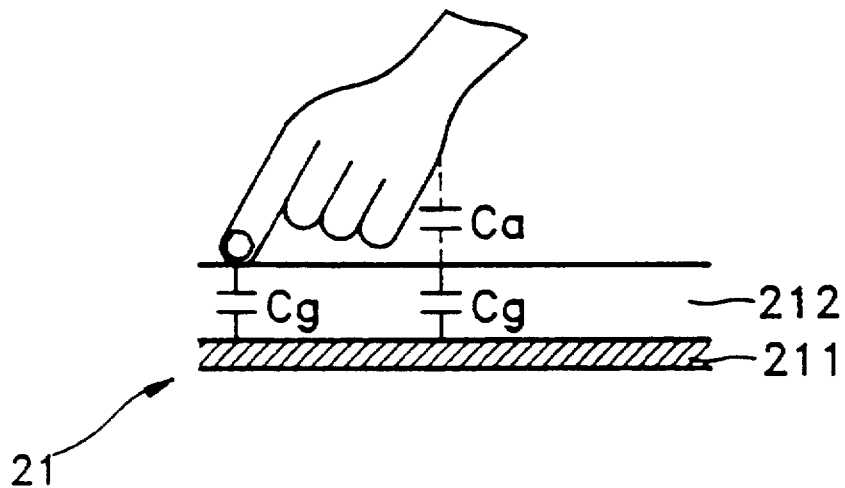
FIG. 2 is a view for explaining the operation of a conventional touch panel.

A touch panel input device according to a preferred embodiment of the present invention uses the same overall operational principle as described with reference to FIG. 1. However, protrusions of, resistive conductor, each protrusion comprising a are uniformly distributed on the upper layer which a pointing means, such as a finger, touches.

Figure 3:
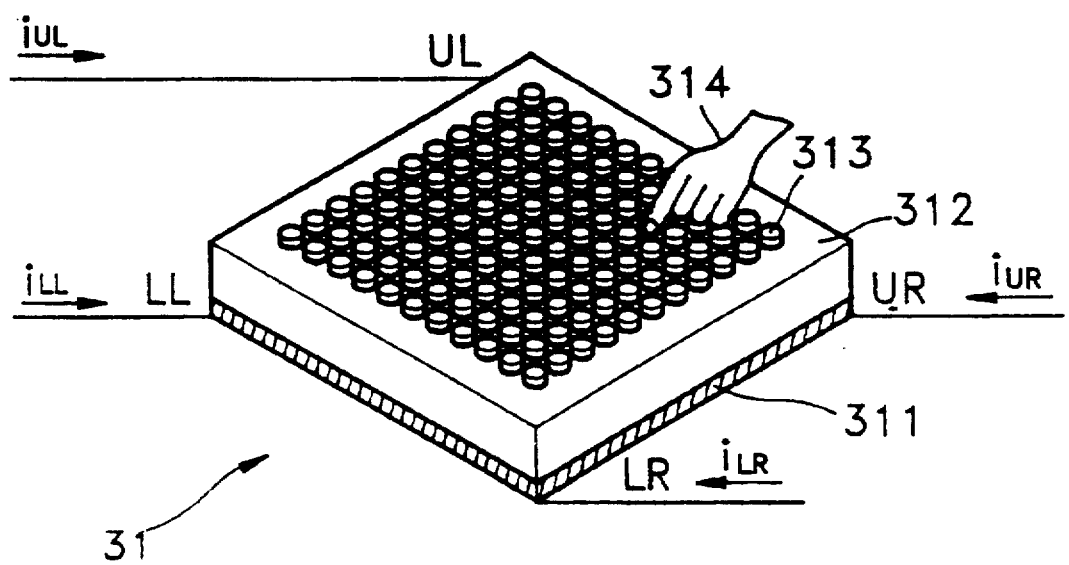
FIG. 3 is a view schematically illustrating a touch panel input device according to an embodiment of the present invention.

As shown in FIG. 3, a touch panel 31 according to the preferred embodiment comprises a lower layer 311 of indium tin oxide (ITO), an upper layer 312 of glass, and protrusions 313 comprising ITO uniformly distributed on the upper layer 312 which a pointing means, such as a finger, touches. Here, UR, UL, LL and LR are terminals connected to the driving circuit 12 (FIG. 1) and the voltage detecting circuit 13 (FIG. 1). When the finger 314 does not touch the protrusions 313 on the contact surface, currents $i_{UR}$, $i_{UL}$, $i_{LL}$ and $i_{LR}$ do not flow to the four terminals UR, UL, LL and LR, respectively. On the contrary, the finger contact results in the current flowing to each terminal.

Figure 4:
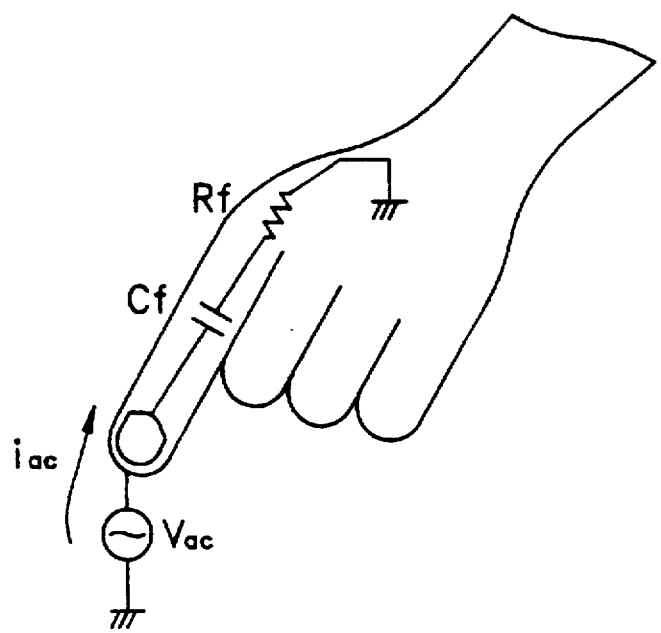
FIG. 4 is a view illustrating an equivalent circuit in relation to the finger shown in the input device of FIG. 3.

Referring to FIG. 4, when an AC (alternating current) signal $V_{ac}$ is applied to a user's finger, a grounded circuit having a finger capacitance $C_f$ and a finger resistance $R_f$ is formed in the finger for flow of an AC current $i_{ac}$. In the same manner, when the finger touches the protrusion of the contact surface, the currents $i_{UR}$, $i_{UL}$, $i_{LL}$ and $i_{LR}$ flow in accordance with the driving signal of FIG. 3.

Figure 5:
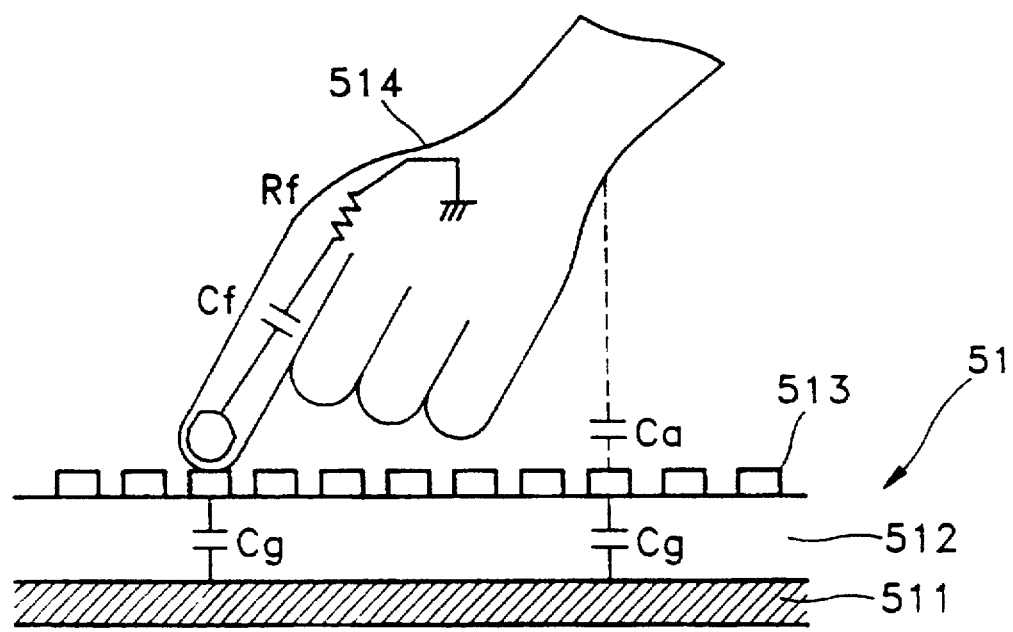
FIG. 5 is a view for explaining the operation of the input device of FIG. 3.

In FIG. 5, as described above, since capacitance $C_g$ is present in an upper layer 512 of a touch panel 51, when a finger 514 touches a protrusion 513, a current due to a driving signal flows to ground via a lower layer 511, capacitances $C_g$ and $C_f$ and resistance $R_f$. Concurrently, since air capacitance $C_a$ is present between the user's finger and an upper layer 512, a noise current flows therethrough.

At the same time, due to electrical action of the protrusion 513 on the upper surface of the upper layer 512, which is the contact surface of the finger 514, the total capacitance of the capacitance $C_g$ of the upper layer 512 and the air capacitance $C_a$ becomes greater. Accordingly, the noise current due to the air capacitance $C_a$ is less so that accuracy and precision in relation to the output data can be improved. Further, as the surface of the panel is not slippery due to the physical configuration of the protrusion 513, adequate touching can be maintained without pressing the panel so firmly.

As described above, in the touch panel input device according to the present invention, noise current due to the air capacitance can be reduced to improve accuracy and precision in relation to the output data and a user need not apply force in order to operate the panel.

It is noted that the present invention is not limited to the preferred embodiment described above, and it is apparent that variations and modifications by those skilled in the art can be effected within the spirit and scope of the present invention defined in the appended claims.

What is claimed is:

1. A touch panel input device comprising:

a touch panel having a lower layer comprising a resistive conductor and an upper layer comprising a dielectric;

a driving circuit for applying a driving signal to a plurality of points on said lower layer;

a voltage detecting circuit for converting currents flowing through each of the plurality of points into a voltage signal for each current;

a switching circuit for switching the voltage signal for each current to generate a coordinate signal; and a plurality of protrusions for decreasing noise current between a pointing device and the touch panel, each protrusion comprising a resistive conductor located on the upper layer of said touch panel.

2. The touch panel input device as claimed in claim 1, wherein the plurality of protrusions are indium tin oxide.

3. The touch panel input device as claimed in claim 2, wherein the lower layer of said touch panel is indium tin oxide.

4. The touch panel input device according to claim 1, wherein the plurality of protrusions extend outwardly from the upper layer, away from the lower layer.

5. The touch panel input device according to claim 1, wherein each protrusion responds electrically when touched by a pointing device without deflection of the protrusions.

6. The touch panel input device as claimed in claim 5, wherein the upper layer is glass.

7. The touch panel input device as claimed in claim 6, wherein the plurality of protrusions are indium tin oxide.

* * * * *

UNITED STATES PATENT AND TRADEMARK OFFICE
CERTIFICATE OF CORRECTION

PATENT NO. : 5,898,426
DATED : April 27, 1999
INVENTOR(S) : HEE-HWAN KIM

It is certified that error appears in the above-identified patent and that said Letters Patent is hereby corrected as shown below:

ON THE TITLE PAGE:

Under Item [75], Inventor, change "Hee-hawn" to --Hee-hwan--.

Signed and Sealed this

Twenty-eighth Day of December, 1999

Attest:

Q. TODD DICKINSON

*Attesting Officer*

*Acting Commissioner of Patents and Trademarks*